(12) United States Patent
Derek et al.

(10) Patent No.: US 9,114,446 B2
(45) Date of Patent: Aug. 25, 2015

(54) METHODS AND SYSTEM FOR MANUFACTURING LEAD BATTERY PLATES

(75) Inventors: Russell Derek, Aspa Bruk (SE); Anders Persson, Vreta Kloster (SE)

(73) Assignee: H. FOLKE SANDELIN AB, Motala (SE)

( * ) Notice: Subject to any disclaimer, the term of this patent is extended or adjusted under 35 U.S.C. 154(b) by 1058 days.

(21) Appl. No.: 13/128,064

(22) PCT Filed: Nov. 7, 2008

(86) PCT No.: PCT/EP2008/065128
§ 371 (c)(1),
(2), (4) Date: Sep. 13, 2011

(87) PCT Pub. No.: WO2010/051848
PCT Pub. Date: May 14, 2010

(65) Prior Publication Data
US 2011/0314885 A1    Dec. 29, 2011

(51) Int. Cl.
*B21C 23/00* (2006.01)
*B21C 23/08* (2006.01)
*B21C 31/00* (2006.01)
*H01M 4/68* (2006.01)

(52) U.S. Cl.
CPC ............ *B21C 23/002* (2013.01); *B21C 23/085* (2013.01); *B21C 31/00* (2013.01); *H01M 4/685* (2013.01)

(58) Field of Classification Search
CPC ........ B21C 23/00; B21C 23/08; B21C 31/00; H01M 4/68; H01M 4/74

USPC ......... 72/20.1, 256, 253.1, 257, 342.2, 342.5, 72/201; 29/2, 6.1; 148/706; 429/225, 241; 428/645
See application file for complete search history.

(56) References Cited

U.S. PATENT DOCUMENTS

| 3,693,394 | A | | 9/1972 | Runevall et al. | |
|---|---|---|---|---|---|
| 3,756,312 | A | * | 9/1973 | Shah et al. | .................... 165/206 |

(Continued)

FOREIGN PATENT DOCUMENTS

| DE | 2 164 218 A1 | 7/1972 |
|---|---|---|
| EP | 1 501 138 A1 | 1/2005 |

(Continued)

OTHER PUBLICATIONS

International Preliminary Report on Patentability; PCT/EP2008/065128.

(Continued)

*Primary Examiner* — Shelley Self
*Assistant Examiner* — Gregory Swiatocha
(74) *Attorney, Agent, or Firm* — Hultquist, PLLC; Steven J. Hultquist

(57) ABSTRACT

Disclosed are methods and a system for manufacturing a lead or lead alloy plate lattice for a lead-acid battery, comprising continuous extrusion of a melt of lead or lead alloy under temperatures lower by 10-100° C. than the melting point of lead, or the lead alloy, the extrudate being subsequently subjected to a flattening process under a temperature lower by more than at least 230° C. than the melting point of lead or the lead alloy, with a total draft rate less than 10%, and thereafter the extrudate may be processed so as to manufacture a plate lattice.

12 Claims, 3 Drawing Sheets

(56) References Cited

U.S. PATENT DOCUMENTS

| | | | |
|---|---|---|---|
| 4,332,629 A * | 6/1982 | McWhinnie | 148/706 |
| 5,611,128 A * | 3/1997 | Wirtz | 29/2 |
| 6,342,110 B1 | 1/2002 | Palumbo | |
| 6,797,403 B2 * | 9/2004 | Clark et al. | 428/596 |
| 2002/0157743 A1 * | 10/2002 | Clark et al. | 148/706 |
| 2005/0066498 A1 * | 3/2005 | Ozaki | 29/6.1 |

FOREIGN PATENT DOCUMENTS

| | | |
|---|---|---|
| JP | 56-141175 A | 11/1981 |
| JP | 56-141176 A | 11/1981 |
| JP | 57-208068 A | 12/1982 |
| JP | 2002-134116 A | 5/2002 |
| JP | 2004-327299 A2 | 11/2004 |
| JP | 2004-327300 A2 | 11/2004 |
| WO | 01/26171 A1 | 4/2001 |
| WO | 02/069421 A2 | 9/2002 |

OTHER PUBLICATIONS

Japanese First Office Action dated Dec. 4, 2012; Appln. No. 2011-535-11.
International Search Report: mailed Jul. 28, 2009; Appln. PCT/EP2008/065128.

* cited by examiner

METHODS AND SYSTEM FOR MANUFACTURING LEAD BATTERY PLATES

TECHNICAL FIELD

The present disclosure relates to a method and a system for manufacturing a lead or lead alloy plate lattice for a lead-acid battery.

BACKGROUND

It is known that repeated charging/discharging of lead or lead alloy acid batteries results in volume growth of the anode. This arises from creep and intergranular corrosion/cracking caused by tensile stress applied by the corrosion product and results in deterioration in the performance of the battery and also reduces its service length. Intergranular corrosion is a localized attack along the grain boundaries, or immediately adjacent to grain boundaries, while the bulk of the grains remain largely unaffected.

It is therefore known that the grain structure in the lead plate affects the occurrence of intergranular corrosion. In order to suppress grain boundary corrosion, the grain size at the anode should be of medium size (often 100-200 µm). At the cathode it is more important that the material is easy to form and manufacture, and depending on manufacturing method, a smaller grain size (10-20 µm) may be preferrable. It is desirable to be able to control and modify the crystallographic structure of grains and grain boundaries during the manufacturing process of lead or lead alloy electrodes.

The lead or lead alloy plate may be manufactured to a plate lattice by a punching process or the plate may be perforated and subsequently stretched to provide a net-like structure.

Another known way to manufacture lead plates is by casting or by a continuous extrusion process. A drawback with continuous extrusion is that the width of the plate is limited by the width of the extrusion apparatus.

In patent application US 2005/0066498A1, a process for manufacturing a lead or lead alloy anode plate lattice for lead-acid batteries with controlled grain size is disclosed. A melt of lead or lead alloy is extruded to the shape of a pipe, provided with a slit and cold rolled. The grain size in the lead or lead alloy plate is controlled by controlling the temperature of the extrudate during the cold rolling. The cold rolling is performed under a temperature of about 50-230° C. below the melting point of lead or the lead alloy, and the extrudate is cold rolled with a total draft rate of about 10-90%.

SUMMARY

It is an object of the present disclosure to provide an alternative or improved manufacturing process of a lead or lead alloy plate lattice for a lead-acid battery.

The invention is defined by the appended independent claims, with embodiments being set forth in the dependent claims, in the following description and in the drawings.

According to a first aspect, a method for manufacturing a lead or lead alloy anode or cathode plate lattice for a lead-acid battery comprises continuous extrusion of a melt of lead or lead alloy under temperatures lower by 10-100° C. than the melting point of lead, or the lead alloy, the extrudate being subsequently subjected to a flattening process under a temperature lower by more than at least 230° C. than the melting point of lead or the lead alloy, and thereafter the extrudate may be processed so as to manufacture a plate lattice.

Thus, the grain size of the extrudate may be controlled directly in the extrusion process, whereby advanced temperature control during a subsequent rolling step may be dispensed with. The grain size in an anode lead or lead alloy plate may be of about 50-300 µm, or preferably of about 100-200 µm. In a cathode lead or lead alloy plate, the grain size may be of about 10-50 µm, or preferably of about 10-20 µm.

The method of the disclosure may comprise flattening, e.g. cold rolling, executed under a temperature lower by more than at least 230° C. than the melting point of lead or the lead alloy.

The draft rate during flattening of the extrudate may be kept to a minimum, since this process affects the grain structure of the lead or lead alloy plate lattice. In the method of the disclosure, the total draft rate during the flattening process may be less than 10%, and preferably the total draft rate may be of about 0-3%.

According to an embodiment of the method, the melt or melt alloy may be extruded to a substantially tubular shape, L-shape or U-shape. The extrudate may further be provided with at least one longitudinal slit, either directly in the die block during the extrusion step, or by a separate cutting device. The at least one longitudinal slit enables unfolding of the extrudate into a substantially continuous plate.

The grain size of the lead or lead alloy may be controlled by cooling of the extrudate with coolants, such as for example air, inert gas, liquified gas, water, vapour, aerosol, cutting fluid, oil, combinations of such coolants, or no coolant at all, either in the die block during the extrusion process or immediately after the extrudate's passage of the die block. In an embodiment of the method, coolant supply parameters, such as supply position, supply rate, coolant temperature, coolant pressure and type of coolant, may be set to adjust the grain size of the extrudate. By "liquified gas" is understood such compositions that would be gaseous at room temperature.

According to an embodiment of the method, the setting of coolant supply parameters may be achieved by feeding coolant to a coolant supply inlet or to a plurality of supply inlets spaced apart in the longitudinal direction of the extrudate.

According to a second aspect, there is provided a method of manufacturing a lead, or lead alloy, plate lattice for a lead-acid battery, comprising the steps of continuously extruding the lead, or lead alloy, under temperatures lower by 10 to 100° C. than the melting point of the lead, or the lead alloy, flattening of an extrudate thus formed with a total draft rate below 10%, and processing the extrudate so as to manufacture a plate lattice.

According to a third aspect, a system for manufacturing a lead or lead alloy plate lattice for a lead-acid battery comprises an extrusion screw for feeding of the lead or lead alloy, a die block, with at least one coolant supply inlet, positioned downstream of the extrusion screw for forming an extrudate having a curved cross section, and a control unit arranged to control a coolant supply to the supply inlet, wherein the control unit is arranged to set at least one coolant supply parameter based on desired grain size of the extrudate.

In one embodiment of the system, a temperature sensor connected to the control unit may be arranged in the die block. The control unit may then be arranged to set the coolant supply parameter based at least partially on a signal from the temperature sensor.

In a further embodiment, the control unit may be arranged to set the coolant supply at least partially based on operator-input parameters.

BRIEF DESCRIPTION OF THE DRAWINGS

In the following, an embodiment will be described in more detail with reference to the accompanying drawings.

DETAILED DESCRIPTION

A lead or lead alloy is melted and then extruded under temperatures lower by 10 to 100° C. than the melting point of lead or the lead alloy.

Extrusion devices and processes for which the present disclosure may be applicable are disclosed in e.g. US 2005/0066498A1 and in U.S. Pat. No. 3,693,394.

Figure 3:
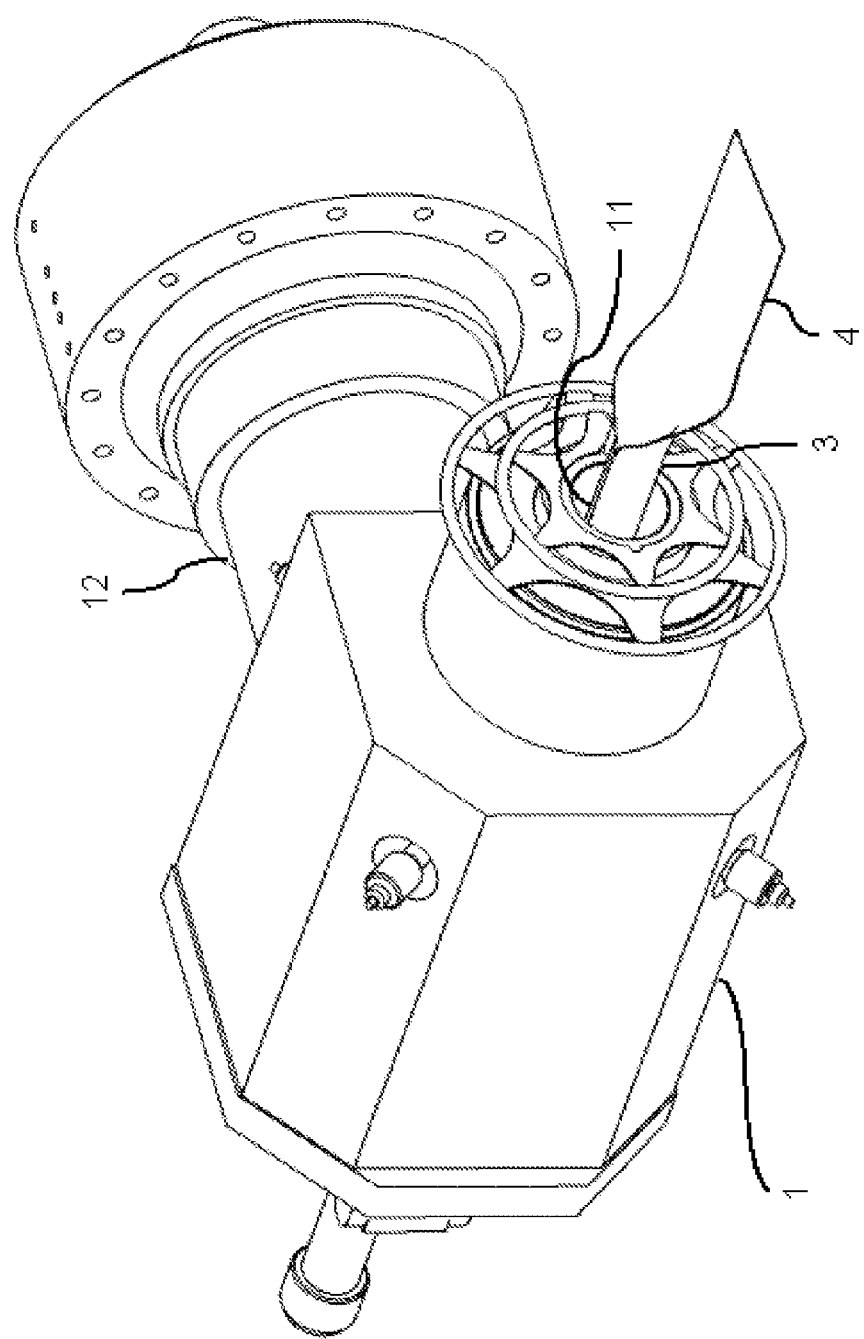
FIG. 3 is a perspective view of an extruder showing the screw housing, the die block and the extrudate outlet.

Referring to the figures, a lead or lead alloy is extruded by an extrusion screw (not shown) in a screw housing 12 (FIG. 3), and fed into a die block 1, which may comprise a pressure build-up zone 2a, a rough shaping zone 2b and a final shaping and cooling zone 2c. The lead or lead alloy may thus be continuously extruded through the die block 1 into e.g. a tubular shape 3 or an L-shape or U-shape (not shown). In particular, the extrudate may have a curved cross section, presenting at least one exposed concave portion and at least one corresponding exposed convex portion. The tubular shaped extrudate 3 may be provided with one or more longitudinal slits 11, and then unfolded into a substantially flat, continuous plate 4 by e.g. a spreader cone 6, or any device having similar function. The extrudated plate 4 may then be flattened in a flattening process, which may include cold rolling in a flattening roll 5.

In one embodiment, the flattening of the extrudate plate 4 may be performed under temperatures lower by more than at least 230° C. than the melting point of lead or the lead alloy, and after the flattening process, the thickness of the plate 4 should be substantially the same as before.

In one embodiment, the longitudinal slit 11 may be provided to the tubular extrudate 3 inside the die block 1 in the extrusion step. In an alternative embodiment, the slit 11 may be provided to the extrudate 3 by an external cutting device 7. The cutting device 7 may be located outside or in connection to the die block 1, before the spreader cone 6 in the extrusion step. The cutting device may also be integrated with the spreader cone 6.

The grain size of the lead or lead alloy may be controlled by cooling of the extrudate following the extrusion step. The die block 1 may include at least one coolant supply inlet.

Figure 2:
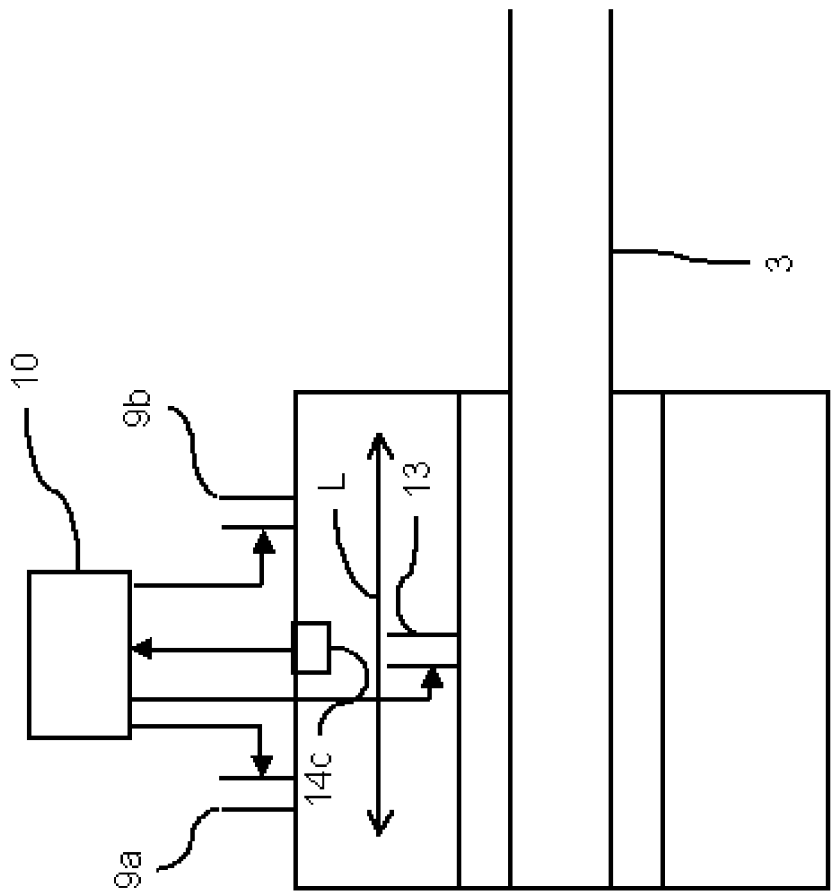
FIG. 2 is schematic view of coolant supply units in the die block.

In one embodiment (FIG. 3), the at least one coolant supply inlet may be provided in the form of at least one movable coolant supply inlet 13 displaceable in the longitudinal direction L of the extrudate 3 in the die block 1, as schematically illustrated in FIG. 2.

Figure 1:
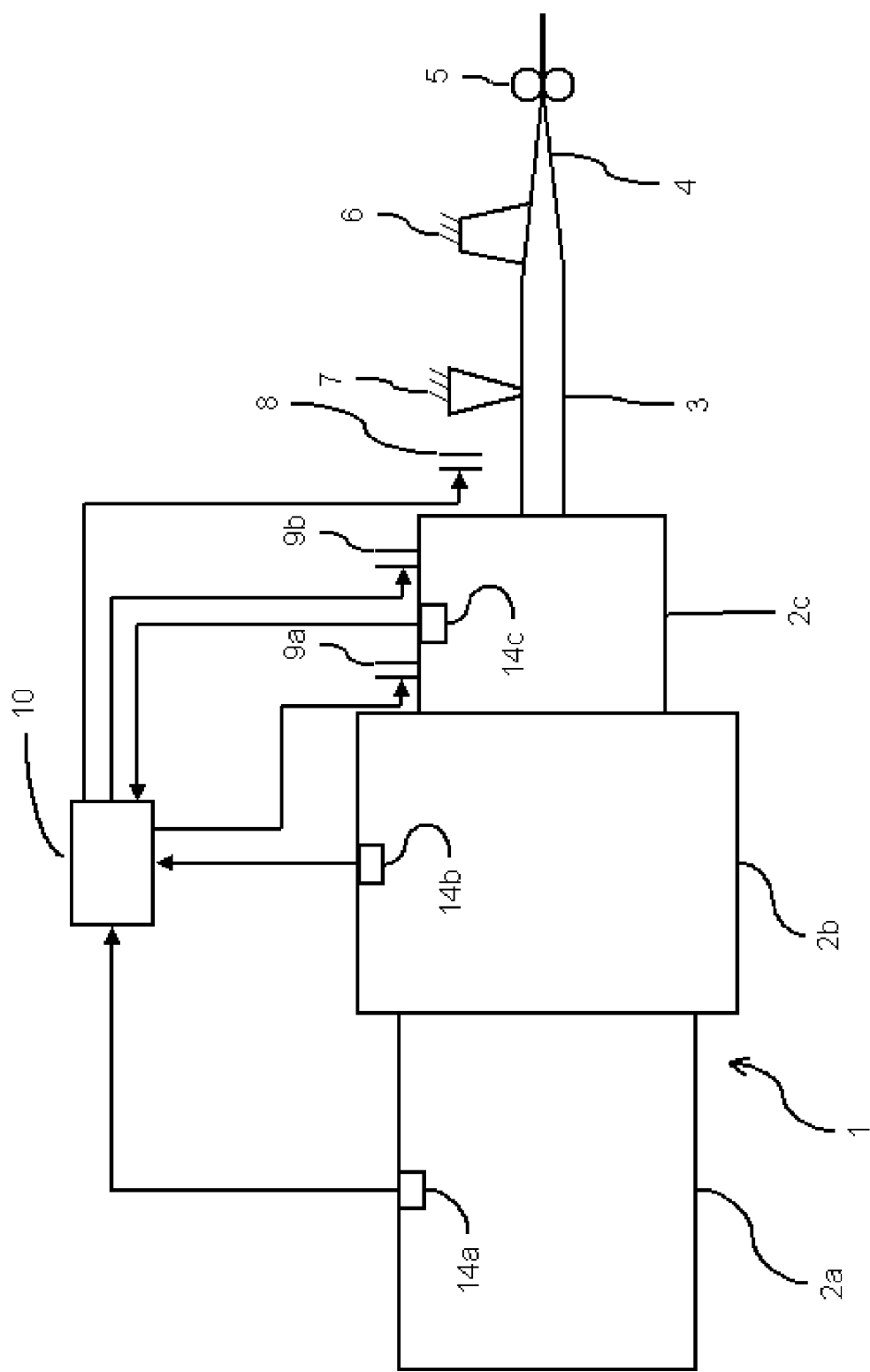
FIG. 1 is a schematic view of an extrusion process from the die block.

In an alternative embodiment, the at least one coolant supply inlet may be provided by a plurality of spaced apart (in a longitudinal direction of the extrudate) coolant supply inlets 9a, 9b, which may be provided in the die block 1 (FIG. 1).

In addition, or as a complement to the above described embodiment, coolant may be added through at least one outer coolant supply inlet 8, which may be located after the extrusion step outside the die block 1.

The cooling of the extrudate in the extrusion step may be achieved by manipulating one or more cooling parameters, such as coolant temperature, coolant pressure, coolant supply rate and type of coolant used.

The coolant supply inlets 8, 9, 13 may be provided with individually controllable valves, and a control unit 10 may be used to control coolant supply inlet with respect to the above mentioned parameters.

For example, to achieve small grains, rapid cooling may achieved by providing a high rate of low temperature coolant at an upstream point 9a in the die block 1. On the other hand, to achive large grains, slow cooling may be achieved by providing a lower rate of higher temperature coolant at a downstream point in the die block 1.

The coolant provided to the at least one coolant supply inlet 8, 9, 13 may be selected from different mediums such as air, inert gas (e.g. carbon dioxide), liquified gas (e.g. liquid nitrogen), water, aerosol, vapour, cutting fluid, oil, combinations of at least two of said coolants or no coolant.

One or more sensors may be provided in the die block 1, to sense temperatures in different portions of the die block 1. Data acquired from such sensors 14a, 14b, 14c may be used as feedback when controlling the cooling parameters.

It is also possible to allow for some manual input, allowing an operator to compensate or fine-tune the coolant supply, e.g. in response to observations that cannot be made with the sensors available.

The control unit 10 may comprise a programmable processing device, provided with software providing the above related functions of controlling coolant selection and supply, sensor data acquisition, feedback control and manual operator input. Naturally, such a control unit 10 may also integrate other control functions of the extrusion process, and optionally control of any downstream processing of the plate lattices manufactured.

The invention claimed is:

1. A method of manufacturing a lead, or lead alloy, plate lattice for a lead-acid battery, comprising the steps of:
   continuously extruding the lead, or lead alloy, under temperatures lower by 10 to 100° C. than the melting point of the lead, or the lead alloy,
   flattening of an extrudate thus formed under a temperature lower by more than at least 267° C. than the melting point of the lead or the lead alloy;
   wherein said step of flattening of said extrudate provides a total draft rate less than 10%, and
   processing the extrudate so as to manufacture the plate lattice wherein an anode lead or lead alloy plate is manufactured, wherein cooling of the extrudate is controlled to provide a grain size of said plate of 50-300 μm.

2. The method according to claim 1, wherein said flattening is performed under a temperature selected from the group consisting of lower by more than at least 287° C. below the melting point of lead or the lead alloy, lower by more than at least 297° C. below the melting point of lead or the lead alloy, and lower by more than at least 307° C. below the melting point of lead or the lead alloy.

3. The method according to claim 1, wherein said flattening step of said extrudate provides a total draft rate selected from the group consisting of less than or equal to 5%, less than or equal to 3%, less than or equal to 1%, and less than or equal to 0.5%.

4. The method according to claim 1 wherein a coolant to cool the extrudate is provided in a die block during the extrusion.

5. The method according to claim 1 wherein a coolant to cool the extrudate is provided after the extrudate's passage of a die block.

6. The method according to claim 1, further comprising setting at least one supply parameter of a coolant based on a desired grain size of the extrudate, said supply parameter being selected from a group consisting of supply position, supply rate, coolant temperature, coolant pressure and type of coolant.

7. The method according to claim 6, wherein said setting is achieved by positioning a supply inlet for said coolant in a longitudinal-direction of the extrudate.

8. The method according to claim 7, wherein said setting is at least partially achieved by selectively feeding the coolant to at least one of a plurality of supply inlets, which are spaced apart in the longitudinal direction of the extrudate.

9. The method according to claim 7, wherein the type of coolant is selected from a group consisting of air, inert gas, liquefied gas, water, oil, cutting fluid, aerosol, vapor, a combination of at least two thereof or no coolant at all.

10. The method according to claim 6, further comprising sensing a temperature in a die block, and setting the supply parameter based on the temperature.

11. The method according to claim 1, wherein a cathode lead or lead alloy plate is manufactured, wherein cooling of the extrudate is controlled to provide a grain size of said plate of 10-50 µm.

12. The method according to claim 1, wherein a cathode lead or lead alloy plate is manufactured, wherein said cooling is controlled to provide a grain size of said plate of 10-20 µm.

* * * * *